UNITED STATES PATENT OFFICE.

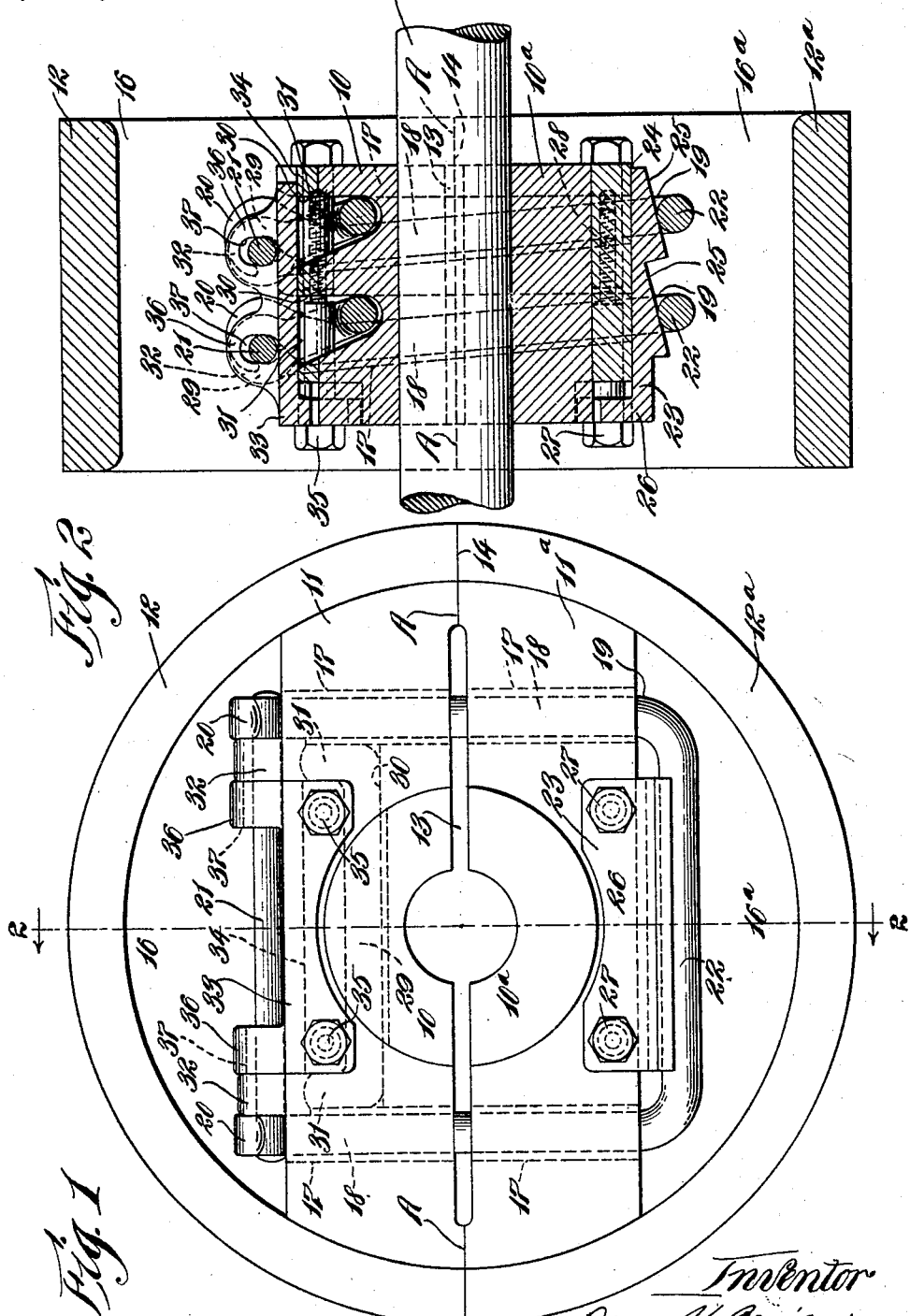

DANA H. BENJAMIN, OF CLEVELAND, OHIO.

PULLEY.

1,321,184.    Specification of Letters Patent.    Patented Nov. 11, 1919.

Application filed November 23, 1916, Serial No. 133,032. Renewed March 3, 1919. Serial No. 280,488.

*To all whom it may concern:*

Be it known that I, DANA H. BENJAMIN, citizen of the United States, residing at Cleveland, in the county of Cuyahoga and State of Ohio, have invented certain new and useful Improvements in Pulleys, of which the following is a specification.

This invention relates to pulleys for shafting. The object of the invention is to provide an improved pulley of the split type which can be easily assembled and secured on the shaft; which can be readily and conveniently manipulated for securing it to the shaft; which has no parts projecting beyond the limits of the rim either radially or longitudinally of the shaft and is therefore safe and guarded against liability of accident, but which nevertheless has the operating parts freely accessible for manipulation; and which has tremendous holding power and can be so firmly clamped to the shaft that it will not work loose. Further objects of the invention will be in part obvious and in part will appear more in detail hereinafter.

The invention comprises the pulley hereinafter described and claimed.

In the drawings, which represent one embodiment of the invention, Figure 1 is an end view; and Fig. 2 is a sectional elevation on the line 2—2, Fig. 1, looking in the direction of the arrow.

The pulley shown in the drawings is split along the line A—A into two halves capable of separation for assembling the pulley on a shaft and removing it therefrom. It comprises a hub consisting of two members 10 and 10$^a$, a body formed of two members, 11 and 11$^a$, and the rim members 12 and 12$^a$. Between the two hub members is located a wide shallow slot 13 so arranged that the two halves of the pulley abut only at the outer ends of the two body members, as at 14, and at the ends of the rim members, the central portions of the two members having sufficient resiliency to enable them to be bent inwardly very slightly toward each other for producing the clamping effect to secure the hub by friction firmly and rigidly upon the shaft 15, which passes through a hole in the center of the two hub members.

The hub members may be integral portions of the body members but as shown are semi-cylindrical in form, provided with the necessary bore for the shaft, and fitting in a cylindrical cavity in the two body members, which in turn, are either secured to or integral with the rim members. The body members are also so formed as to provide cavities or recesses 16, 16$^a$, adjacent the rim members to receive some of the operating parts of the device, as will appear. Body members 11 and 11$^a$ are provided with transverse holes 17, which lie on either side of the shaft 15 and are of uniform width from end to end transversely of said shaft, but taper or have walls gradually diverging from bottom to top, as shown in Fig. 2. In the particular form of the invention shown there are four of these holes located in pairs, the holes of each pair being directly opposite each other. Each pair of holes receives the arms 18 of a U-shaped clamping member 19, shown as formed of a bent metal bar, the free ends of whose arms are bent or otherwise formed to provide hook members 20 engaging over a transverse bar or rod 21. The middle portion 22 of each clamping member 19 lies in one of the recesses 16, 16$^a$, while the bar or rod 21 lies in the other recess.

Between the middle portions 22 of the clamping members and the adjacent body portion 11$^a$ of the pulley is located a wedge member 23 having a flat face 24 sliding on the outer flat face of the body member 11$^a$, or in a groove or recess therein, and two inclined surfaces 25 to receive the middle portions 22 of the clamping members. At one end said wedge member is provided with ears or a flange 26 perforated to receive clamping bolts 27 extending through openings in the body member 11$^a$. These bolts may be any suitable form but are shown as blind bolts consisting of two headed members having telescoping threaded engagement with each other, as at 28, within the body member 11$^a$. The bolts can therefore be tightened up without leaving projecting ends of the bolt beyond the usual clamping nuts, as with the common types of bolts. By tightening up the bolt the wedge member is forced in between the clamping members 19 and the body member 11$^a$ and forces the two body members toward each other to clamp the hub members upon the shaft.

Coöperating with each clamping member 19 is what may be termed a toggle member 29, which is a U-shaped bar lying in a recess or cavity 30 of the body member 11, and which cavity also passes [through] member 10, the arms 31 of said toggle member extending outwardly into the space 16 where they are provided with eyes 32 through which pass the rods 21 before referred to. The walls of the recess 30 diverge upwardly, as shown in Fig. 2. Between the rods 21 and the adjacent body member 11 is located a slide 33, seated in a recess 34 of the body member and operated by bolts 35 in the same manner as the clamping wedge 23. This slide is provided with outwardly extending ears 36, two of which are provided for each rod 21, said ears having elongated slots 37 through which the rods extend.

The pulley described is secured to the shaft by placing its two halves upon the shaft and pushing arms 18 of the clamping members 19 up through their holes until they hook over the other ends of the rod 21, in which position the pulley and all of its parts will hang on its shaft.

The wedge member 23 is then adjusted by its bolts to the right in Fig. 2, which tightens up the clamping member 19 and exerts an initial clamping pressure by the wedge effect upon the hub members of the pulley. The bolts 35 are then screwed up to adjust the slide 33 to the right in Fig. 2. It will be observed that the arms 18 of the clamping members 19 are inclined from a straight transverse position in Fig. 2, and that the arms of the toggle member 34 are likewise inclined but at a more acute angle. Consequently when the slide 33 is adjusted the rods 21 are carried to the right and swing outwardly with the eyes 32 around the axis of the middle portions 36 of the toggle members. The arms 34 and 18 tend to move into line with each other, and a tremendous clamping effect is produced by the toggle action of the two U-shaped members. Indeed the clamping effect is so great that when the bolts are screwed up it is practically impossible to loosen the pulley from the shaft except by unscrewing the bolts.

While in the drawings I have shown two sets of clamping members 19 and coöperating toggle members 34, it will be understood that one set of said members is sufficient and that more than two can be used when the pulley is of greater extent lengthwise of the shaft. A plurality of sets of clamping devices are utilized to more evenly distribute the pressure along the hub members 10 and 10ª.

In the pulley described the two halves can be very conveniently assembled around a shaft already installed. Moreover, the clamping effect is produced entirely by the bolts 27 and 35, which are conveniently accessible at the ends of the pulley and can be operated readily and with ordinary tools. [Serious ———] clamping devices are —— pulley does away with a the clamping effect. Again, all —— whose erative parts are contained within the lim— of the rim so that there are no projections which might catch upon clothing or other parts and cause accident.

Further advantages of the invention will be readily apparent to those skilled in the art.

What I claim is:—

1. A pulley, comprising two members adapted to embrace a shaft, a U-shaped clamping device having arms passing through openings in the two pulley members for connecting the same, a rod connecting the free ends of said arms, and a wedge movable between the middle portion of said clamping device and one of said pulley members for clamping said pulley to the shaft.

2. A pulley, comprising two members adapted to embrace a shaft, and toggle means for securing said pulley to the shaft.

3. A pulley, comprising two members adapted to embrace a shaft, two relatively inclined members extending transversely to said shaft, one of said members connecting the two pulley members, said relatively inclined members being connected to each other and means for straightening said inclined members to secure the pulley to the shaft.

4. A pulley, comprising two members adapted to embrace a shaft, a U-shaped member connecting the two pulley members and embracing the shaft, a second U-shaped member lying on one side of the shaft, a rod connecting the arms of said U-shaped members and means for adjusting said rod to produce a toggle effect and secure the pulley to the shaft.

5. A pulley, comprising two members adapted to embrace a shaft, a clamping member connecting the members of said pulley, means for producing a wedge effect at one end of said clamping member, and means for producing a toggle effect at the other end of said clamping member for securing the pulley to the shaft.

6. A pulley comprising two members adapted to embrace a shaft, a clamping member connecting the members of said pulley, a movable wedge coöperating with one end of said clamping member, and an adjustable toggle device engaging the other end of said clamping member for securing the pulley to the shaft.

7. A pulley, comprising two members adapted to embrace a shaft, a clamping member connecting the two members of the pulley, a swinging toggle member connected to one end of said clamping member, and means for turning said toggle member to clamp the pulley to the shaft.

8. A pulley, comprising two members adapted to embrace a shaft, a clamping member connecting the two members of the pulley, a swinging toggle member connected to one end of said clamping member, a movable slide, and means connecting said slide to said swinging toggle member for turning the same to clamp the pulley to the shaft.

In testimony whereof I affix my signature.

DANA H. BENJAMIN.

Copies of this patent may be obtained for five cents each, by addressing the "Commissioner of Patents. Washington, D. C."